(12) United States Patent
Wang et al.

(10) Patent No.: US 9,314,092 B2
(45) Date of Patent: Apr. 19, 2016

(54) WRIST STRAP FOR AN ELECTRONIC DEVICE

(71) Applicants: HONG FU JIN PRECISION INDUSTRY (ShenZhen) CO., LTD., Shenzhen (CN); HON HAI PRECISION INDUSTRY CO., LTD., New Taipei (CN)

(72) Inventors: Hong-Zhneg Wang, Shenzhen (CN); Fu Liao, Shenzhen (CN); Ming-Chang Lee, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/542,185

(22) Filed: Nov. 14, 2014

(65) Prior Publication Data

US 2016/0058162 A1 Mar. 3, 2016

(30) Foreign Application Priority Data

Aug. 29, 2014 (CN) .......................... 2014 1 0434669

(51) Int. Cl.
*A45F 5/00* (2006.01)
*A45F 5/02* (2006.01)

(52) U.S. Cl.
CPC ... *A45F 5/00* (2013.01); *A45F 5/02* (2013.01); *A45F 5/021* (2013.01); *A45F 2005/008* (2013.01)

(58) Field of Classification Search
CPC ....... A45F 5/00; A45F 2005/008; A45F 5/02; A45F 5/021

USPC .................. 224/219, 218, 222, 267, 197, 930
See application file for complete search history.

(56) References Cited

U.S. PATENT DOCUMENTS

| 5,353,974 | A  | * | 10/1994 | Maurizio | ....................... 224/219 |
| 5,412,545 | A  | * | 5/1995  | Rising   | ........................... 362/105 |
| 6,360,928 | B1 | * | 3/2002  | Russo    | ........................... 224/218 |
| 6,880,737 | B2 | * | 4/2005  | Bauer    | ........................... 224/246 |

(Continued)

FOREIGN PATENT DOCUMENTS

| CN | 101485559 A | 7/2009 |
| TW | 417923      | 1/2001 |

(Continued)

*Primary Examiner* — Justin Larson
*Assistant Examiner* — Lester L Vanterpool
(74) *Attorney, Agent, or Firm* — Novak Druce Connolly Bove + Quigg LLP

(57) ABSTRACT

A wrist strap includes a receiving member for receiving an electronic device and a surrounding strap. The receiving member includes a base board and a side plate extending from an edge of the base board. The base board defines a slot. The slot defines a receiving hole and two positioning holes. The surrounding strap includes a first end, a second end opposite to the first end, and a protruding portion located between the first end and the second end. The free end of the protruding portion includes two fixing pieces. Each fixing piece protrudes a fixing portion toward the surrounding strap. The protruding portion and the two fixing pieces extend through the receiving hole of the receiving member, the receiving member and the surrounding strap rotate relative to each other to make the two fixing portion be locked in the two positioning holes.

9 Claims, 5 Drawing Sheets

(56) References Cited

U.S. PATENT DOCUMENTS

| | | | |
|---|---|---|---|
| D548,457 S * | 8/2007 | Reinerio | D3/218 |
| 7,424,110 B1 * | 9/2008 | Whiten, III | 379/454 |
| 7,529,155 B2 * | 5/2009 | Fasciano | 368/10 |
| 7,942,293 B2 * | 5/2011 | Lawrence et al. | 224/218 |
| 8,328,055 B1 * | 12/2012 | Snyder | A45F 5/00 224/197 |
| 8,584,916 B1 * | 11/2013 | Chen | 224/199 |
| 8,616,423 B2 * | 12/2013 | Wizikowski | 224/218 |
| 8,662,362 B1 * | 3/2014 | Bastian | H04B 1/3888 224/197 |
| 8,936,222 B1 * | 1/2015 | Bastian et al. | 248/206.5 |
| 2003/0213822 A1 * | 11/2003 | Lautner | 224/221 |
| 2006/0196902 A1 * | 9/2006 | Chen et al. | 224/197 |
| 2009/0321483 A1 * | 12/2009 | Froloff | 224/267 |
| 2010/0327030 A1 * | 12/2010 | Yang | A45F 5/00 224/199 |
| 2012/0080462 A1 * | 4/2012 | Hajarian | 224/219 |
| 2012/0255978 A1 * | 10/2012 | Williams | 224/219 |

FOREIGN PATENT DOCUMENTS

| | | |
|---|---|---|
| TW | M270459 | 7/2005 |
| TW | 524065 | 7/2011 |

* cited by examiner

WRIST STRAP FOR AN ELECTRONIC DEVICE

FIELD

The subject matter herein generally relates to a wrist strap, and particularly to a wrist strap for an electronic device.

BACKGROUND

Some electronic devices need a cover or a wrist strap to protect and allow easy transport.

BRIEF DESCRIPTION OF THE DRAWINGS

Implementations of the present technology will now be described, by way of example only, with reference to the attached figures.

DETAILED DESCRIPTION

Figure 1:
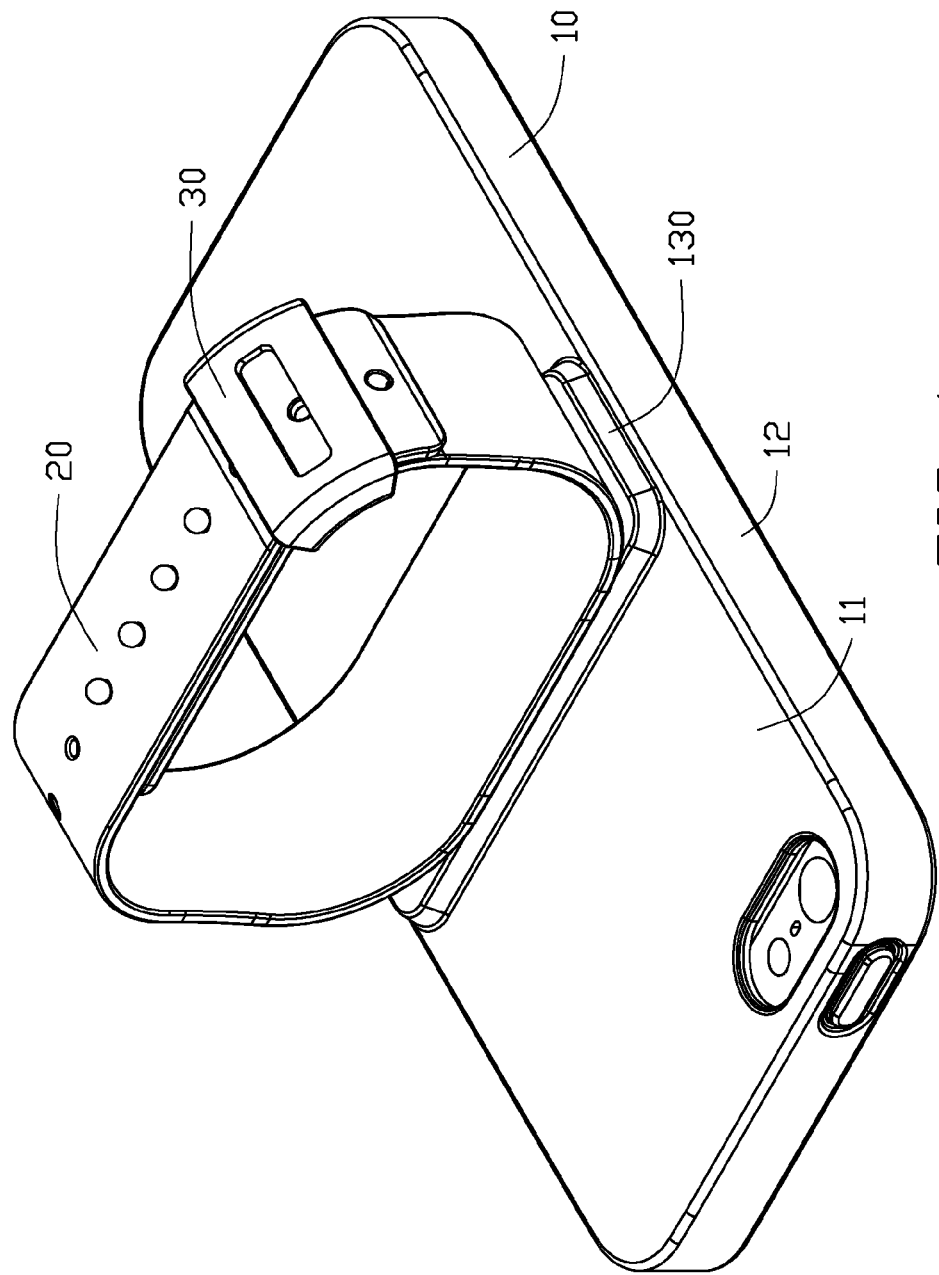
FIG. 1 is an assembled, isometric view of an embodiment of a wrist strap, the wrist strap includes a receiving member, a surrounding strap and lock member.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a wrist strap to cover and carry an electronic device conveniently.

Figure 2:
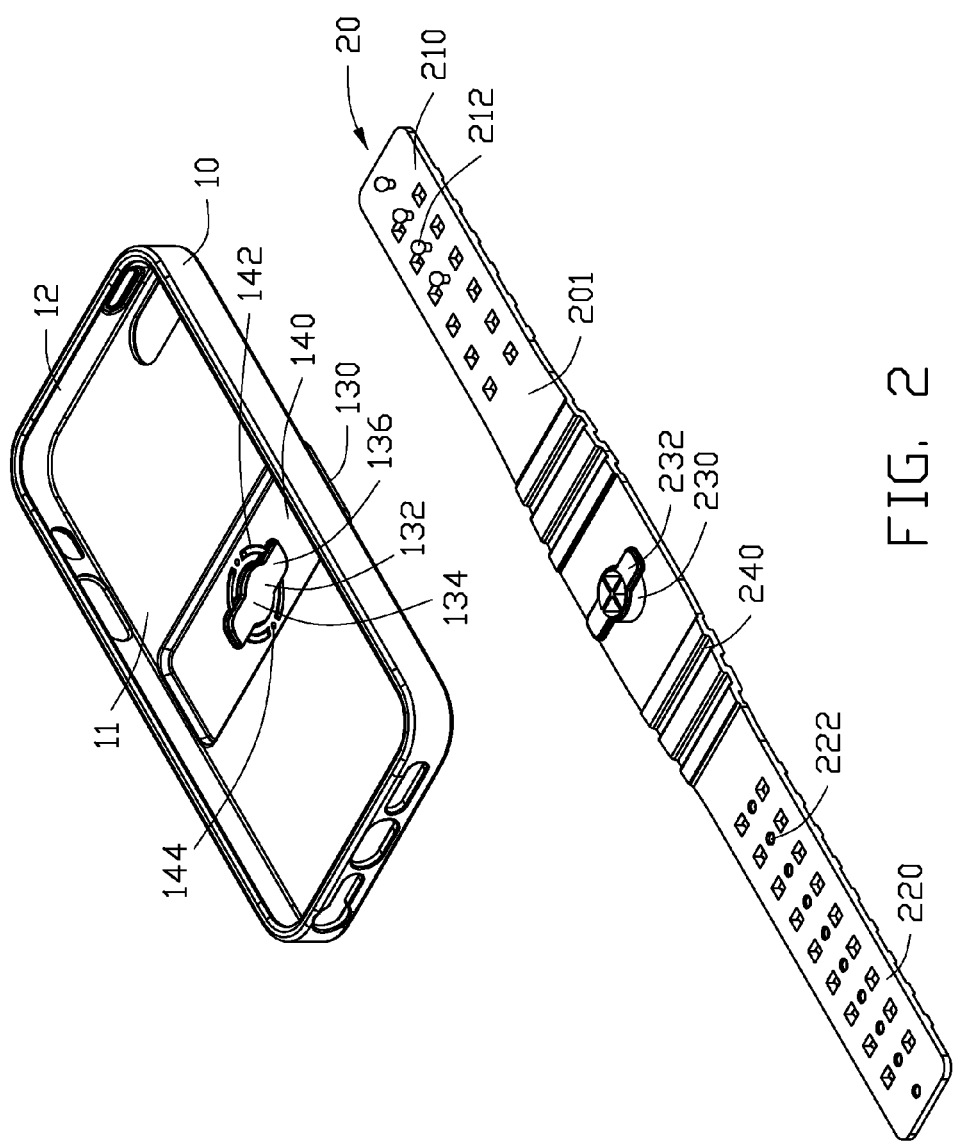
FIG. 2 is an exploded, isometric view of the receiving member and the surrounding strap of FIG. 1.

FIGS. 1 and 2 illustrate an embodiment of a wrist strap. The wrist strap includes a receiving member 10, a surrounding strap 20, and a lock member 30. The surrounding strap 20 is detachably attached to the back of the receiving member 10. The receiving member 10 can be made of thermoplastic polyurethane or polycarbonate. The surrounding strap 20 can be made of thermoplastic polyurethane or silica gel with variety of colors. The lock member 30 can be made of thermoplastic polyurethane.

The receiving member 10 includes a substantially rectangular base board 11 and a side plate 12 extending vertically from the edge of the base board 11. The receiving member 10 can hold an electronic device such as a mobile phone or a music player. The base board 11 can support the electronic device. A platform 130 extends out from the base board 11, thereby defining a recess 140 at an inside of the base board 11. A receiving hole 132 is defined in a middle of the platform 130. The receiving hole 132 includes a round hole 134 in the middle and two square holes 136 at two opposite sides of the round hole 134 communicating with the round hole 134. In at least one embodiment, the two square holes 136 are defined along the widthwise direction of the receiving member 10. The inside of the recess 140 defines a pair of rotary grooves 142 along the circumference of the receiving hole 132 and a positioning hole 144 is located at the middle of each rotary grooves 142.

The surrounding strap 20 is elongated, and includes a first side 201, a second side 202 opposite to the first side 201, a first end 210 and a second end 220 opposite to the first end. A plurality of columns 212 extends from the first side 201 at the first end 210. The columns 212 are arranged in a line along the lengthwise direction of the surrounding strap 20. The second end 220 defines a plurality of fixing holes 222. The fixing holes 222 are arranged in a line along the lengthwise direction of the surrounding strap 20. The number of the fixing holes 222 is greater than the number of the columns 212.

Figure 3:
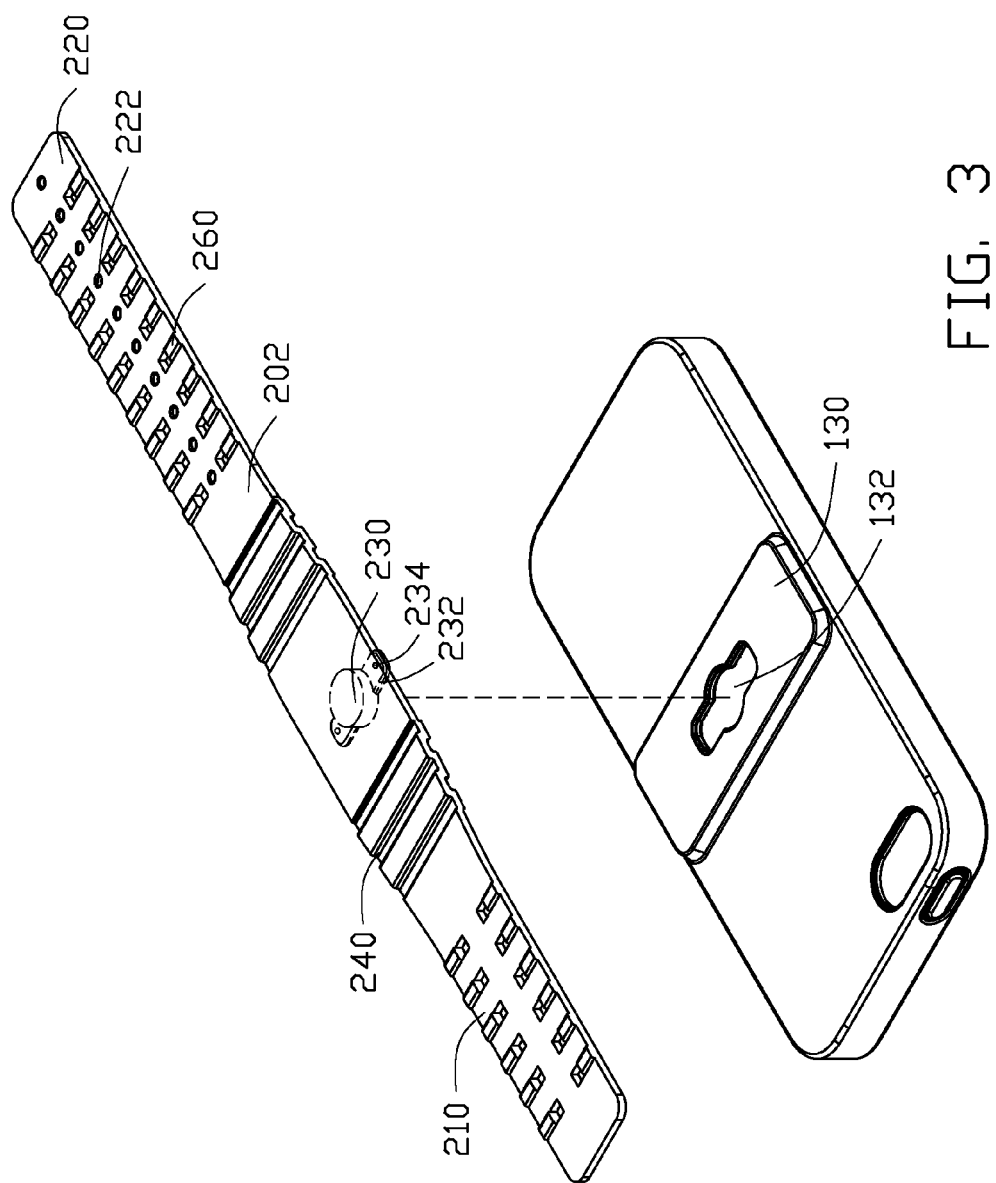
FIG. 3 is similar to FIG. 2, but viewed from different angle.

FIG. 3 illustrates that a cone-shaped protruding portion 230 extends from a middle of the first side 201 of the surrounding strap 20 corresponding to the round hole 134. Two opposite fixing pieces 232 extends from the free end of the protruding portion 230 corresponding to the square holes 136. A fixing portion 234 protrudes from each fixing piece 232 toward the first side 201 of surrounding strap 20. The surrounding strap 20 defines a plurality of folded slots 240 adjacent to two opposite sides of the protruding portion 230. The second side 202 of the surrounding strap 20 includes a plurality of skid-proof stripes 260.

Figure 4:
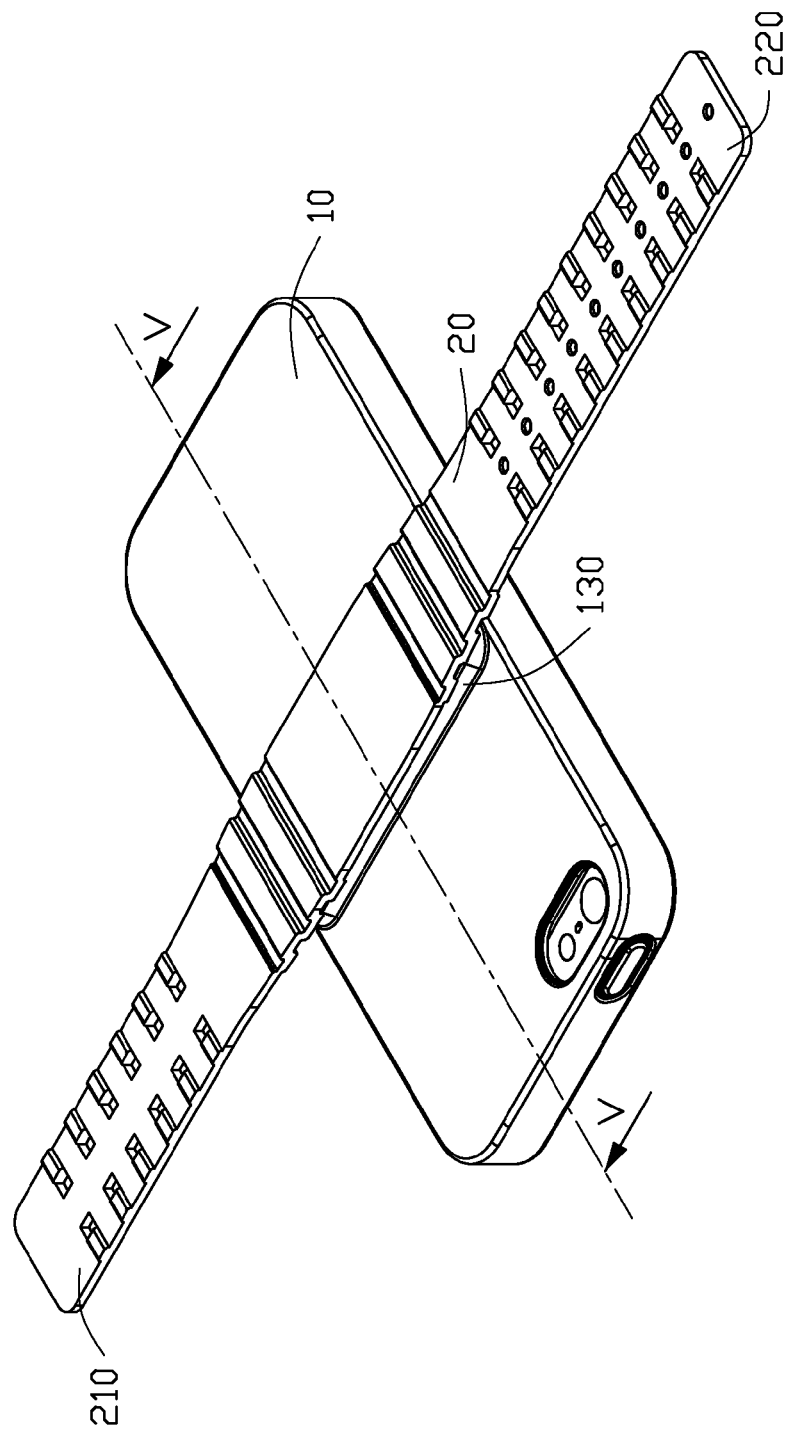
FIG. 4 is an assembled, isometric view of FIG. 3.
Figure 5:
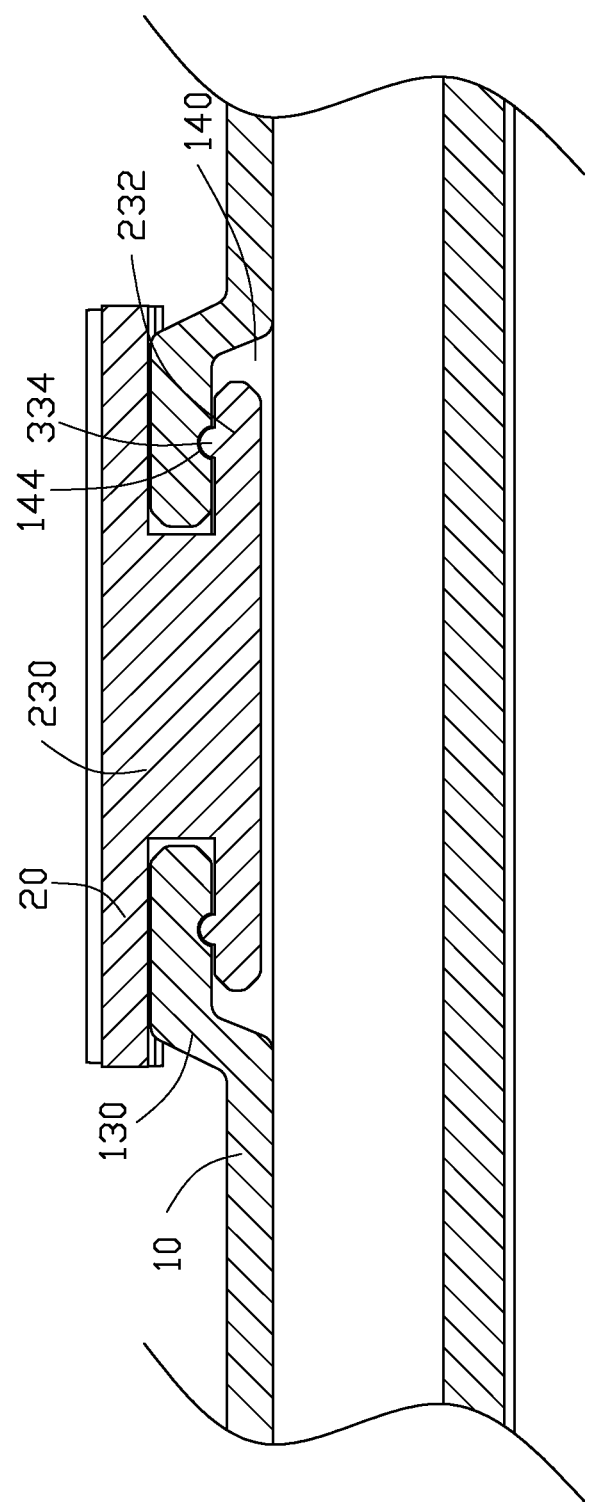
FIG. 5 is a cross-sectional view along the line V-V of FIG. 4.

FIGS. 4 and 5 illustrate when in assembly, the first side 201 of the surrounding strap 20 faces the outer side of the base board 11 of the receiving member 10. The protruding portion 230 and the fixing pieces 232 extend through the receiving hole 132. The surrounding strap 20 is rotated to make the two fixing portions 234 slide along the rotary grooves 142, until the two fixing portions 234 respectively lock in the two positioning holes 144. The second end 220 of the surrounding strap 20 penetrates the lock member 30. The columns 212 at the first end 210 of the surrounding strap 20 are locked in the fixing holes 222 at the second end 220. The lock member 30 can be slid to fix the first end 210 and the second end 220 together to form a wristband which can be sheathed on an arm of a user. And the user can move the location of the junction of the columns 212 and the fixing holes 222 to adjust the wristband to fit the arm.

In other embodiments, the number of the fixing holes 222 is equal to the number of the columns 212. The first end 210 and second end 220 of the surrounding strap 20 can be VELCRO.

The receiving member 10 can hold an electronic device and the surrounding strap 20 can be sheathed on different arms for convenience.

It is to be understood, however, that even though numerous characteristics and advantages of the embodiments have been set forth in the foregoing description, together with details of the structure and function of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A wrist strap comprising:
   a receiving member configured to receive an electronic device, comprising a base board and a side plate extending from an edge of the base board, the base board defines a slot, the slot defines a receiving hole and two positioning holes; and
   a surrounding strap comprising a first end, a second end opposite to the first end, a protruding portion between the first end and the second end, a free end of the protruding portion comprising two fixing pieces, a fixing portion protrudes from each fixing piece toward the surrounding strap;
   wherein the first end of the surrounding strap can be locked at the second end by bending the surrounding strap, the protruding portion and the two fixing pieces extend through the receiving hole of the receiving member, the receiving member and the surrounding strap rotate relative to each other to make the two fixing portion be locked in the two positioning holes.

2. The wrist strap of claim 1, wherein a platform extends out from the outer side of the base board, thereby defining a recess at an inside of the base board.

3. The wrist strap of claim 1, wherein the surrounding strap is elongated, and comprises a first side and a second side, a plurality of columns extends from the first side at the first end along the lengthwise direction of the surrounding strap, the second end defines a plurality of fixing holes corresponding to the columns, and the protruding portion is in the first side.

4. The wrist strap of claim 3, wherein the number of the fixing holes is greater than the number of the columns.

5. The wrist strap of claim 1, wherein the wrist strap also comprises a lock member, which fixes first end and the second end of the surrounding strap together.

6. The wrist strap of claim 1, wherein the slot defines a pair of rotary grooves inside along the circumference of the receiving hole and a positioning hole is located at a middle of each rotary groove.

7. The wrist strap of claim 1, wherein the receiving hole comprises a round hole in the middle and two opposite square hole at two opposite sides of the round hole and coupled to the round hole, the protruding portion is cone-shaped, and extending through the round hole, and the two fixing pieces are extending through the square holes.

8. The wrist strap of claim 1, wherein the surrounding strap defines a plurality of folded slots respectively adjacent to the two sides of the protruding portion.

9. The wrist strap of claim 5, wherein the receiving member can be made of thermoplastic polyurethane or polycarbonate, the surrounding strap can be made of thermoplastic polyurethane or silica gel with variety of colors, and the lock member can be made of thermoplastic polyurethane.

* * * * *